(12) United States Patent
Chamberlin et al.

(10) Patent No.: US 8,497,608 B2
(45) Date of Patent: Jul. 30, 2013

(54) ELECTRIC MACHINE COOLING SYSTEM AND METHOD

(75) Inventors: Bradley D. Chamberlin, Pendleton, IN (US); Colin J. Hamer, Noblesville, IN (US); Cary D. Ramey, Greenwood, IN (US)

(73) Assignee: Remy Technologies, LLC, Pendelton, IN (US)

( * ) Notice: Subject to any disclaimer, the term of this patent is extended or adjusted under 35 U.S.C. 154(b) by 357 days.

(21) Appl. No.: 13/016,940

(22) Filed: Jan. 28, 2011

(65) Prior Publication Data

US 2012/0194012 A1 Aug. 2, 2012

(51) Int. Cl.
*H02K 9/00* (2006.01)
(52) U.S. Cl.
USPC .................................. 310/58; 310/59; 310/61
(58) Field of Classification Search
USPC ....................................................... 310/52–64
See application file for complete search history.

(56) References Cited

U.S. PATENT DOCUMENTS

| | | | |
|---|---|---|---|
| 2,080,678 A | 5/1937 | Van Horn et al. | |
| 2,264,616 A | 12/1941 | Buckbee | |
| 3,447,002 A | 5/1969 | Ronnevig | |
| 3,525,001 A | 8/1970 | Erickson | |
| 3,748,507 A | 7/1973 | Sieber | |
| 4,038,570 A | 7/1977 | Durley, III | |
| 5,081,382 A | 1/1992 | Collings et al. | |
| 5,180,004 A | 1/1993 | Nguyen | |
| 5,207,121 A | 5/1993 | Bien | |
| 5,293,089 A | 3/1994 | Frister | |
| 5,372,213 A | 12/1994 | Hasebe et al. | |
| 5,519,269 A | 5/1996 | Lindberg | |
| 5,616,973 A | 4/1997 | Khazanov | |
| 5,713,427 A | 2/1998 | Lutz et al. | |
| 5,718,302 A * | 2/1998 | Hasebe et al. | 180/65.6 |
| 5,859,482 A | 1/1999 | Crowell et al. | |
| 5,923,108 A | 7/1999 | Matake et al. | |
| 5,937,817 A | 8/1999 | Schanz et al. | |
| 5,965,965 A | 10/1999 | Umeda et al. | |

(Continued)

FOREIGN PATENT DOCUMENTS

| | | |
|---|---|---|
| JP | 05-103445 A | 4/1993 |
| JP | 05-292704 A | 11/1993 |

(Continued)

OTHER PUBLICATIONS

WIPO Search Report and Written Opinion dated Oct. 29, 2012 for corresponding Application No. PCT/US2012/033915; 8 sheets.

(Continued)

*Primary Examiner* — Tran Nguyen
*Assistant Examiner* — Leda Pham
(74) *Attorney, Agent, or Firm* — Greenberg Traurig LLP

(57) ABSTRACT

Some embodiments of the invention provide an electric machine module comprising an electric machine including a rotor assembly and a rotor hub. In some embodiments, the module can include a output shaft substantially circumscribed by the rotor hub and including at least one channel and at least one coolant outlet. A cavity can be formed by at least the output shaft and the rotor hub. Some embodiments can include a sleeve substantially circumscribing a portion of the output shaft with at least a portion of the sleeve positioned substantially within the cavity between the output shaft and the rotor hub. The sleeve can include at least one groove.

20 Claims, 5 Drawing Sheets

U.S. PATENT DOCUMENTS

| | | | |
|---|---|---|---|
| 6,011,332 A | 1/2000 | Umeda et al. | |
| 6,069,424 A | 5/2000 | Colello et al. | |
| 6,075,304 A | 6/2000 | Nakatsuka | |
| 6,087,746 A | 7/2000 | Couvert | |
| 6,095,754 A | 8/2000 | Ono | |
| 6,097,130 A | 8/2000 | Umeda et al. | |
| 6,114,784 A | 9/2000 | Nakano | |
| 6,147,430 A | 11/2000 | Kusase et al. | |
| 6,147,432 A | 11/2000 | Kusase et al. | |
| 6,173,758 B1 | 1/2001 | Ward et al. | |
| 6,181,043 B1 | 1/2001 | Kusase et al. | |
| 6,201,321 B1 | 3/2001 | Mosciatti | |
| 6,208,060 B1 | 3/2001 | Kusase et al. | |
| 6,232,687 B1 | 5/2001 | Hollenbeck et al. | |
| 6,242,836 B1 | 6/2001 | Ishida et al. | |
| 6,258,001 B1 | 7/2001 | Wakuta et al. | |
| 6,291,918 B1 | 9/2001 | Umeda et al. | |
| 6,300,693 B1 | 10/2001 | Poag et al. | |
| 6,313,559 B1 | 11/2001 | Kusase et al. | |
| 6,333,573 B1 | 12/2001 | Nakamura | |
| 6,335,583 B1 | 1/2002 | Kusase et al. | |
| 6,346,758 B1 | 2/2002 | Nakamura | |
| 6,359,232 B1 | 3/2002 | Markovitz et al. | |
| 6,373,155 B1 | 4/2002 | Shimizu et al. | |
| 6,397,968 B2 | 6/2002 | Sugano et al. | |
| 6,404,628 B1 | 6/2002 | Nagashima et al. | |
| 6,417,592 B2 | 7/2002 | Nakamura et al. | |
| 6,459,177 B1 | 10/2002 | Nakamura et al. | |
| 6,509,665 B1 | 1/2003 | Nishiyama et al. | |
| 6,515,392 B2 | 2/2003 | Ooiwa | |
| 6,522,043 B2 | 2/2003 | Masegi | |
| 6,559,572 B2 | 5/2003 | Nakamura | |
| 6,579,202 B2 | 6/2003 | El-Antably et al. | |
| 6,727,609 B2 * | 4/2004 | Johnsen | 310/52 |
| 6,770,999 B2 | 8/2004 | Sakurai | |
| 6,777,837 B2 | 8/2004 | Tsuzuki et al. | |
| 6,897,594 B2 | 5/2005 | Ichikawa et al. | |
| 6,903,471 B2 | 6/2005 | Arimitsu et al. | |
| 6,998,749 B2 | 2/2006 | Wada et al. | |
| 7,002,267 B2 | 2/2006 | Raszkowski et al. | |
| 7,026,733 B2 | 4/2006 | Bitsche et al. | |
| 7,239,055 B2 | 7/2007 | Burgman et al. | |
| 7,276,006 B2 | 10/2007 | Reed et al. | |
| 7,284,313 B2 | 10/2007 | Raszkowski et al. | |
| 7,339,300 B2 | 3/2008 | Burgman et al. | |
| 7,352,091 B2 | 4/2008 | Bradfield | |
| 7,402,923 B2 | 7/2008 | Klemen et al. | |
| 7,417,344 B2 | 8/2008 | Bradfield | |
| 7,508,100 B2 | 3/2009 | Foster | |
| 7,538,457 B2 | 5/2009 | Holmes et al. | |
| 7,545,060 B2 | 6/2009 | Ward | |
| 7,592,045 B2 | 9/2009 | Smith et al. | |
| 7,615,903 B2 | 11/2009 | Holmes et al. | |
| 7,615,951 B2 | 11/2009 | Son et al. | |
| 7,667,359 B2 | 2/2010 | Lee et al. | |
| 7,939,975 B2 | 5/2011 | Saga et al. | |
| 8,067,865 B2 | 11/2011 | Savant | |
| 8,068,327 B2 | 11/2011 | Seifert et al. | |
| 2003/0222519 A1 | 12/2003 | Bostwick | |
| 2004/0036367 A1 | 2/2004 | Denton et al. | |
| 2004/0189110 A1 | 9/2004 | Ide | |
| 2004/0195929 A1 | 10/2004 | Oshidari | |
| 2005/0023266 A1 | 2/2005 | Ueno et al. | |
| 2005/0023909 A1 | 2/2005 | Cromas | |
| 2005/0194551 A1 | 9/2005 | Klaussner et al. | |
| 2005/0274450 A1 | 12/2005 | Smith et al. | |
| 2005/0285456 A1 | 12/2005 | Amagi et al. | |
| 2007/0024130 A1 | 2/2007 | Schmidt | |
| 2007/0052313 A1 | 3/2007 | Takahashi | |
| 2007/0063607 A1 | 3/2007 | Hattori | |
| 2007/0145836 A1 | 6/2007 | Bostwick | |
| 2007/0149073 A1 | 6/2007 | Klaussner et al. | |
| 2007/0216236 A1 | 9/2007 | Ward | |
| 2008/0223557 A1 | 9/2008 | Fulton et al. | |
| 2009/0121562 A1 | 5/2009 | Yim | |
| 2009/0174278 A1 | 7/2009 | Sheaffer et al. | |
| 2009/0206687 A1 | 8/2009 | Woody et al. | |
| 2010/0026111 A1 | 2/2010 | Monzel | |
| 2010/0102649 A1 | 4/2010 | Cherney et al. | |
| 2010/0109454 A1 | 5/2010 | Vadillo et al. | |
| 2010/0176668 A1 | 7/2010 | Murakami | |
| 2011/0050141 A1 | 3/2011 | Yeh et al. | |
| 2011/0101700 A1 | 5/2011 | Stiesdal | |
| 2011/0109095 A1 | 5/2011 | Stiesdal | |

FOREIGN PATENT DOCUMENTS

| | | |
|---|---|---|
| JP | 06-036364 U | 5/1994 |
| JP | 06-311691 A | 11/1994 |
| JP | 07-264810 A | 10/1995 |
| JP | 08-019218 A | 1/1996 |
| JP | 09-046973 A | 2/1997 |
| JP | 09-154257 A | 6/1997 |
| JP | 10-234157 A | 9/1998 |
| JP | 11-132867 A | 5/1999 |
| JP | 11-206063 A | 7/1999 |
| JP | 2000-152563 A | 5/2000 |
| JP | 2000-324757 A | 11/2000 |
| JP | 2000-333409 A | 11/2000 |
| JP | 2001-333559 A | 11/2001 |
| JP | 2002-095217 A | 3/2002 |
| JP | 2002-119019 A | 4/2002 |
| JP | 2003-250247 A | 9/2003 |
| JP | 2003-299317 A | 10/2003 |
| JP | 2003-324901 A | 11/2003 |
| JP | 2004-215353 A | 7/2004 |
| JP | 2004-236376 A | 8/2004 |
| JP | 2004-248402 A | 9/2004 |
| JP | 2004-297924 A | 10/2004 |
| JP | 2004-312886 A | 11/2004 |
| JP | 2004-357472 A | 12/2004 |
| JP | 2005-012989 A | 1/2005 |
| JP | 2005-057957 A | 3/2005 |
| JP | 2005-168265 A | 6/2005 |
| JP | 2006-060914 A | 3/2006 |
| JP | 2000-152561 A | 9/2006 |
| JP | 2006-297541 A | 11/2006 |
| JP | 2006-528879 A | 12/2006 |
| JP | 2007-282341 A | 10/2007 |
| JP | 2008-021950 A | 2/2008 |
| JP | 2008-206213 A | 9/2008 |
| JP | 2008-219960 A | 9/2008 |
| JP | 4187606 B2 | 11/2008 |
| JP | 2008-544733 A | 12/2008 |
| JP | 2009-247084 A | 10/2009 |
| JP | 2009-247085 A | 10/2009 |
| JP | 2009-254205 A | 10/2009 |
| JP | 2010-028908 A | 2/2010 |
| JP | 2010-028958 A | 2/2010 |
| JP | 2010-035265 A | 2/2010 |
| JP | 2010-063253 A | 3/2010 |
| JP | 2010-121701 A | 6/2010 |
| KR | 10-1997-0055103 A | 7/1997 |
| KR | 10-2000-0013908 A | 3/2000 |
| KR | 10-2006-0102496 A | 9/2006 |
| KR | 10-2007-0027809 A | 3/2007 |
| KR | 10-2009-0048028 A | 5/2009 |

OTHER PUBLICATIONS

WIPO Search Report and Written Opinion dated Nov. 14, 2012 for corresponding Application No. PCT/US2012/040794; 8 sheets.
International Search Report.
International Search Report completed Apr. 19, 2012.
International Search Report completed Apr. 9, 2012.
International Search Report completed Apr. 20, 2012.
International Search Report completed Mar. 8, 2012.
International Search Report completed Apr. 24, 2012.

* cited by examiner

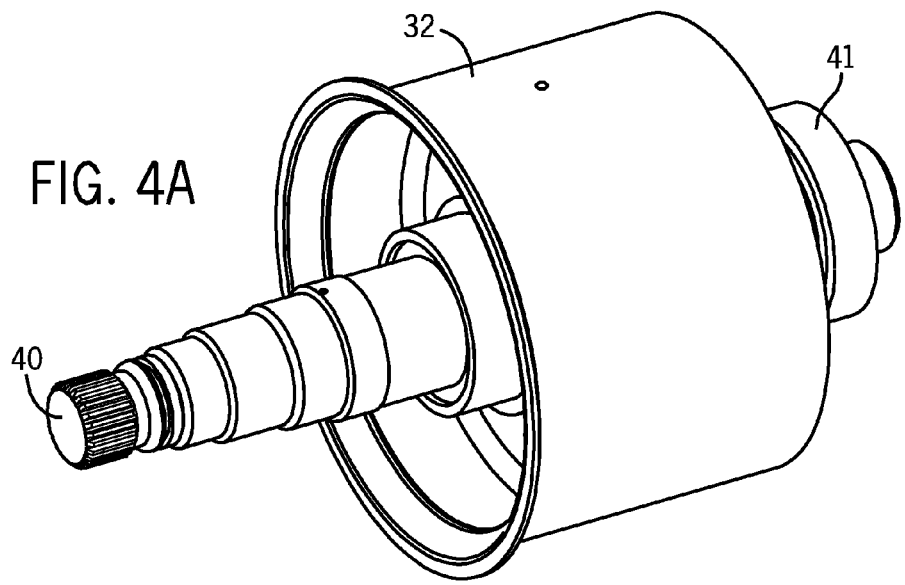
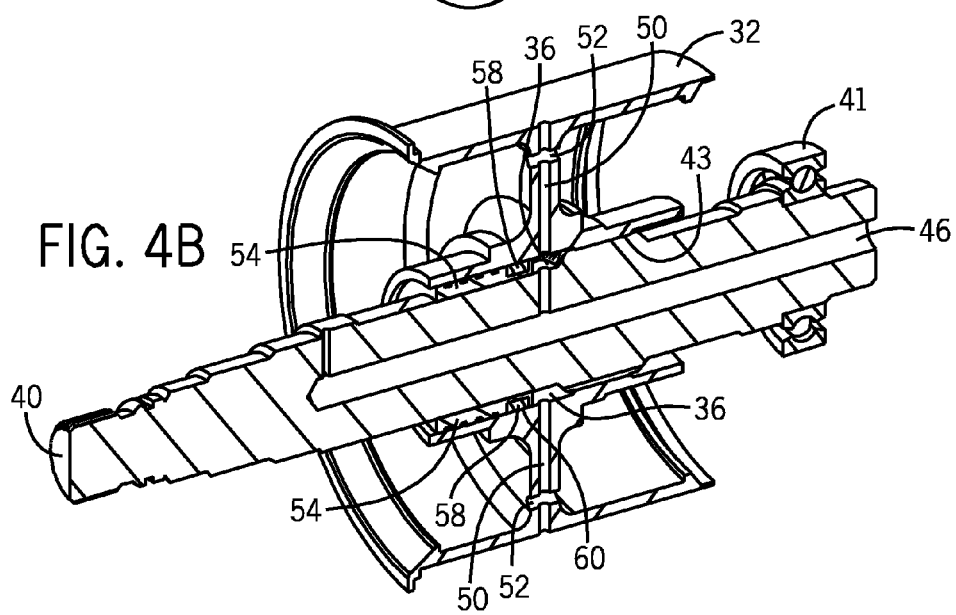
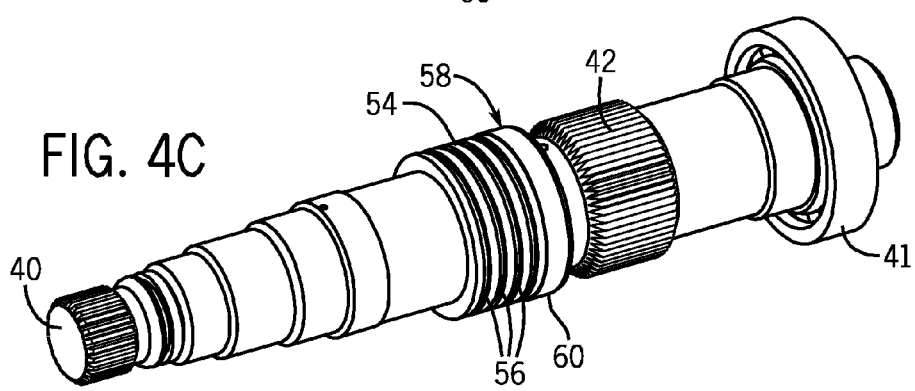

ELECTRIC MACHINE COOLING SYSTEM AND METHOD

BACKGROUND

Electric machines are generally comprised of a stator assembly and a rotor assembly. During operation of the electric machines, a considerable amount of heat energy can be generated by both the stator assembly and the rotor assembly, in addition to other components of the electric machines. Conventional cooling methods can include removing the generated heat energy by convection to a jacket filled with a coolant.

Limitations associated with some electric machines can include difficulties associated with designing insulation for some portions of the stator assembly, however, difficulties also can arise in cooling of the rotor assembly. Also, some electric machines, including interior permanent magnet electric machines, can include magnets, which can generate heat energy but can be difficult to cool. If not properly cooled, the magnets can become largely demagnetized which can lead to a decrease in electric machine productivity and lifespan.

SUMMARY

Some embodiments of the invention provide an electric machine module comprising an electric machine including a rotor assembly and a rotor hub. In some embodiments, the module can include an output shaft substantially circumscribed by the rotor hub and including at least one channel and at least one coolant outlet. A cavity can be formed by at least the output shaft and the rotor hub. Some embodiments can include a sleeve substantially circumscribing a portion of the output shaft with at least a portion of the sleeve positioned substantially within the cavity between the output shaft and the rotor hub. In some embodiments, the sleeve can include at least one groove.

Some embodiments of the invention provide an electric machine module comprising an electric machine including a rotor assembly and a rotor hub. In some embodiments, the module can include an output shaft substantially circumscribed by the rotor hub and including at least one channel and at least one coolant outlet. A cavity can be formed by at least the output shaft and the rotor hub. Some embodiments can include a sleeve substantially circumscribing a portion of the output shaft with at least a portion of the sleeve positioned substantially within the cavity between the output shaft and the rotor hub. In some embodiments, the sleeve can include a gland and a seal member.

Some embodiments of the invention provide an electric machine module comprising an electric machine including a rotor assembly and a rotor hub. In some embodiments, the module can include an output shaft substantially circumscribed by the rotor hub and including at least one channel and at least one coolant outlet. In some embodiments, the output shaft can include an integral sleeve. A cavity can be formed by at least the output shaft and the rotor hub.

DESCRIPTION OF THE DRAWINGS

FIG. 4A is a perspective view of a rotor hub and an output shaft according to one embodiment of the invention.

FIG. 4B is a cross-sectional view of the rotor hub, the output shaft, and a sleeve of FIG. 4A.

FIG. 4C is a perspective view of an output shaft and a sleeve according to one embodiment of the invention.

DETAILED DESCRIPTION

Figure 1:
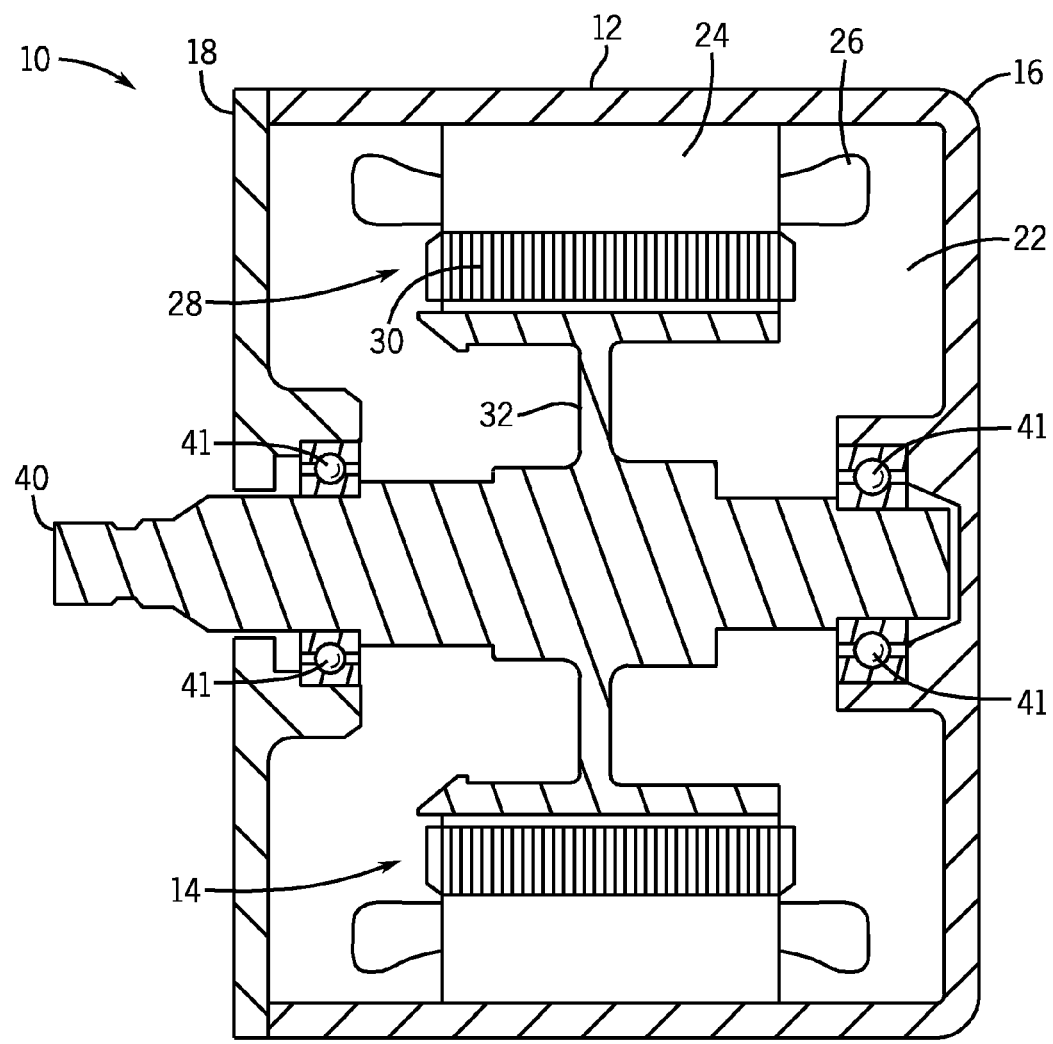
FIG. 1 is a perspective view of an electric machine module according to one embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

FIG. 1 illustrates an electric machine module 10 according to one embodiment of the invention. The electric machine module 10 can include a housing 12 which can substantially circumscribe an electric machine 14. In some embodiments, the housing 12 can comprise a substantially enclosed, substantially cylindrical canister 16 and an end cap 18, and can be coupled via fasteners 20 to enclose the electric machine 14 within a machine cavity 22. The electric machine 14 can be housed within the machine cavity 22 at least partially defined by the canister 16 and the end cap 18. In some embodiments, the housing can comprise a sleeve member (not shown), a first end cap (not shown), and a second end cap (not shown). For example, the sleeve member and the end caps can be coupled via conventional fasteners (not shown), or another suitable coupling manner, to enclose the electric machine 14 within the machine cavity 22.

Figure 2:
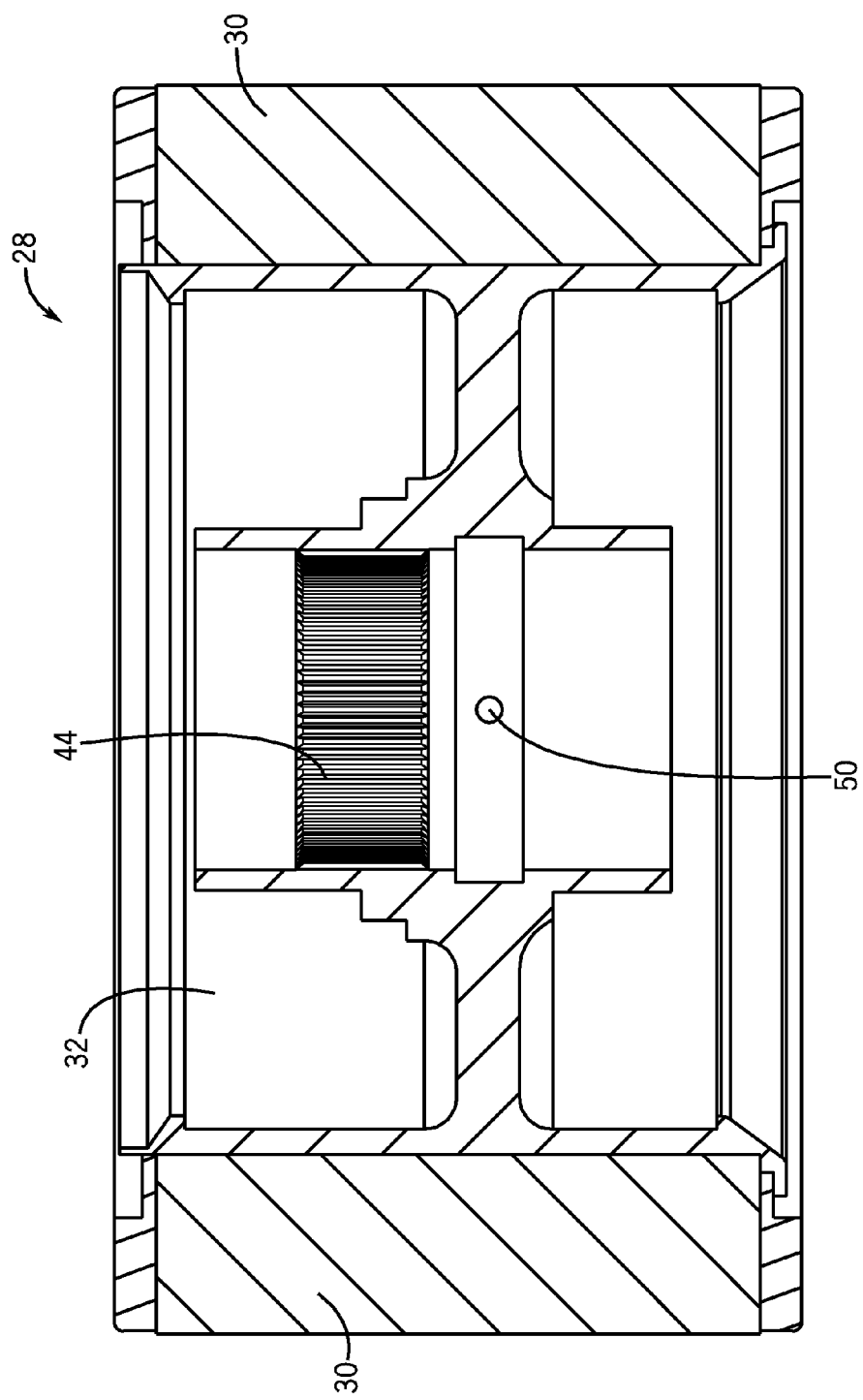
FIG. 2 is a cross-sectional view of a rotor assembly.

In some embodiments, the electric machine 14 can include a stator assembly 24 including stator end turns 26, a rotor assembly 28 comprising a plurality of rotor laminations 30 and a rotor hub 32, and bearings 41. As shown in FIG. 2A, the stator assembly 24 can, at least partially, circumscribe the rotor assembly 28.

In some embodiments, the rotor assembly 28 can be operatively coupled to, and rotate about a output shaft 40. In some embodiments, the operative coupling can be at least partially achieved by the use of an axial seal 43. In some embodiments, the axial seal 43 can comprise engaging a plurality of output shaft splines 42, which can be located on a portion of an outer diameter of the output shaft 40, with a plurality of rotor hub splines 44, which can be positioned on an inner diameter of the rotor hub 32, as shown in FIG. 2 and FIGS. 4A-4C. More specifically, in some embodiments, during operation of the electric machine 14, when the output shaft splines 42 are engaged with the rotor hub splines 44, torque generated by the electric machine 14 can be transferred from the rotor assembly 28 to the output shaft 40. Furthermore, in some embodiments, the splines 42, 44, can be tightly engaged so that the interface can be substantially sealed and can generally prevent a liquid from flowing in any material amounts through the spline 42, 44 interface.

Additionally, the axial seal 43 can comprise other conventional sealing elements, which can substantially contact, or be substantially integral with at least the outer diameter of the output shaft 40. In some embodiments, the axial seal 43 can comprise the output shaft 40 operatively coupled to a positive stop (not shown) on the rotor hub 32 to transfer torque and can generally prevent a liquid from flowing in any material amounts through the axial seal 43. In some embodiments, the output shaft 40 can be operatively coupled to the positive stop on the rotor hub 32 using a bolt (not shown) or any other conventional fastener. In other embodiments, the axial seal 32 can comprise other conventional sealing structures which could generally prevent a liquid from flowing in any material amounts through the axial seal 43 and operatively couple the rotor hub 32 and the output shaft 40.

In other embodiments, the axial seal 43 can comprise a structure (not shown) positioned at either or both axial ends of the electric machine module 10 proximal to where the output shaft 40 emerges from the rotor hub 31. More specifically, the structure can be dimensioned to substantially contact at least the output shaft 40 to generally prevent a liquid from flowing in any material amounts through the axial seal 43. In some embodiments, the structure can substantially contact or be proximal to other module 10 components, such as the rotor hub 31. In some embodiments, the structure can comprise a plug, a seal, a sealing bearing, an o-ring, or other conventional structures which could prevent a material amount of liquid from flowing through the axial seal 43. Furthermore, in some embodiments, the structure can be integral with the output shaft 40. In other embodiments, the structure can comprise a separate element and can be installed on the output shaft 40, before, during, or after assembly of the module 10.

In some embodiments, a cavity 36 can be formed between a portion of the inner diameter of the rotor hub 32, the outer diameter of the output shaft 40, and the axial seal 43. As discussed in further detail below, the cavity 36 can be used to aid in cooling the rotor assembly 28 and other elements of the electric machine module 10.

In some embodiments, the electric machine 14 can be an interior permanent magnet electric machine, in which case, the rotor assembly 28 can include at least one magnet 34 positioned in the rotor assembly 28. Also, the electric machine 14 can be, without limitation, an electric motor, such as an induction electric motor, a hybrid motor, an electric generator, or a vehicle alternator. In one embodiment, the electric machine 14 can be a High Voltage Hairpin (HVH) electric motor for use in a hybrid vehicle.

Components of the electric machine 14 such as, but not limited to, the stator assembly 24, the rotor assembly 28, and their respective components, can generate heat energy during the operation of the electric machine 14. These components can be cooled to enhance the performance and increase the lifespan of the electric machine 14.

In some embodiments, a coolant can be dispersed from a point generally radially central with respect to the electric machine module 10. In some embodiments, the coolant can comprise a number of substances, including, but not limited to transmission oil, motor oil, another oil, or another similar substance. In some embodiments, a coolant source (not shown) can be located either internal or adjacent to a output shaft 40 so that the coolant can flow either inside of or adjacent to the output shaft 40. More specifically, in some embodiments, the output shaft 40 can include at least one output shaft channel 46 and at least one output shaft coolant outlet 48 so that the coolant can flow through the channel 46 and a portion of the coolant can exit the output shaft channel 46 through the output shaft coolant outlet 48. In some embodiments, the output shaft coolant outlet 48 can comprise a plurality of output shaft coolant outlets 48. Also, in some embodiments, the output shaft coolant outlet 48 can be in fluid communication with the cavity 36, so that as coolant circulates through the output shaft coolant outlet 48, the coolant can enter the cavity 36. Furthermore, in some embodiments, more than one output shaft coolant outlet 48 can be included. Also, in some embodiments, output shaft coolant outlets 48 can be positioned along the axial length of the output shaft 40 so that the coolant can be dispersed to different areas of the module 10, including the output shaft bearings 41.

Figure 3:
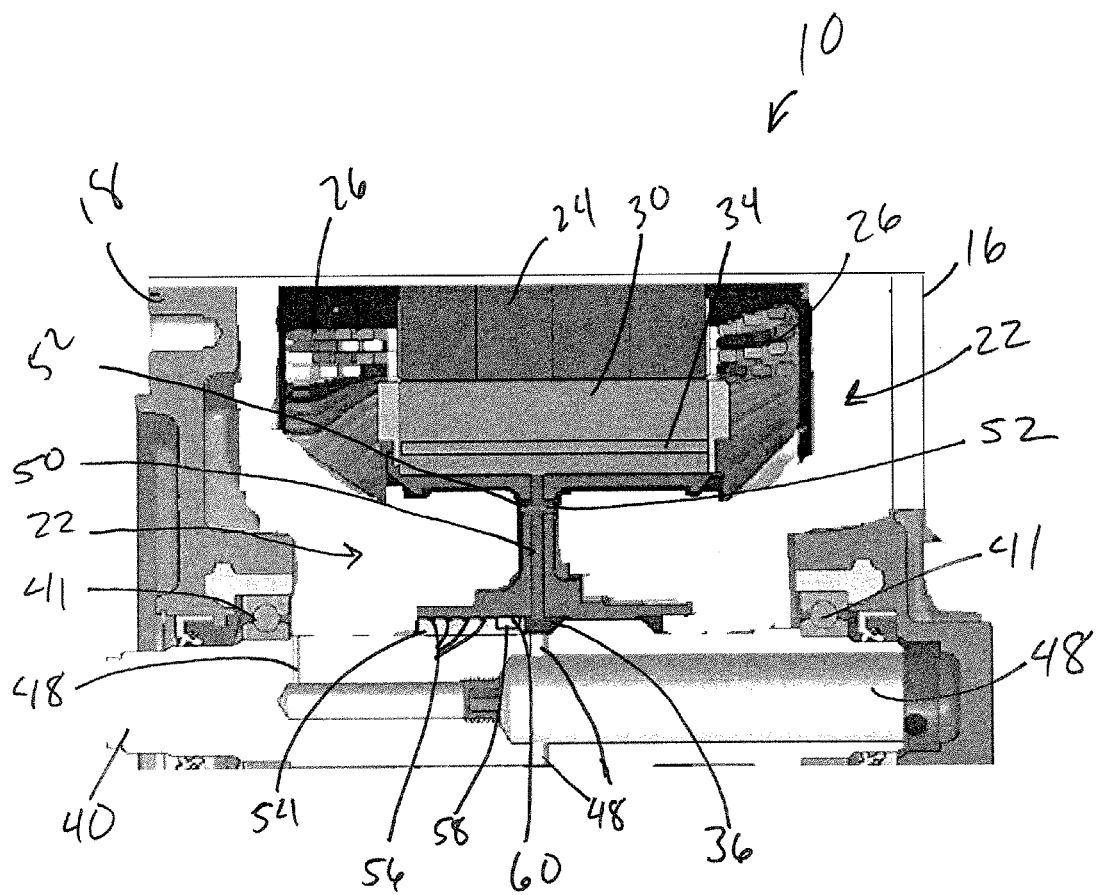
FIG. 3 is a cross-sectional view of an electric machine module according to one embodiment of the invention.
Figure 5:
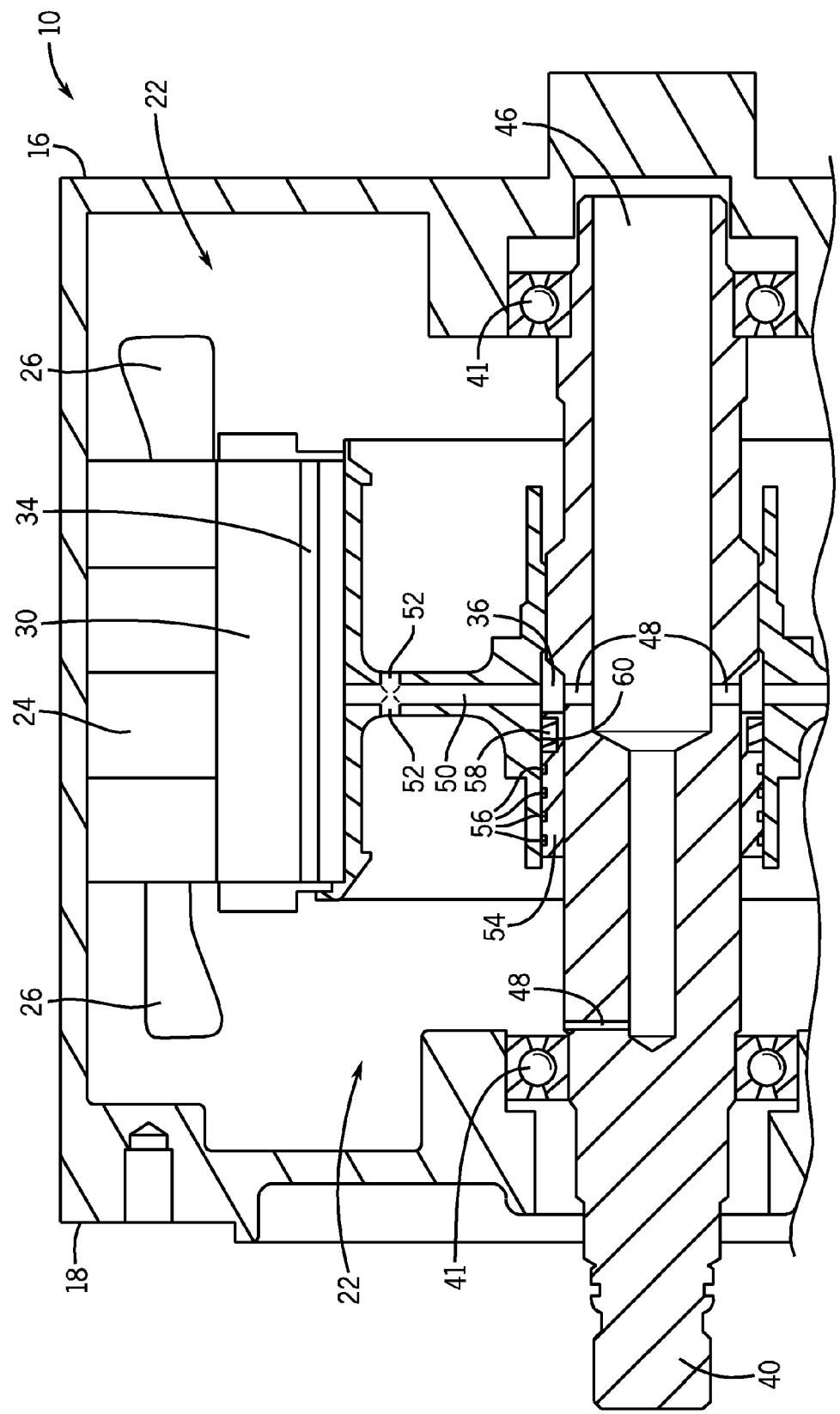
FIG. 5 is a cross-sectional view of an electric machine module according to one embodiment of the invention.

As shown in FIGS. 3 and 4, some embodiments of the invention can include at least one rotor hub channel 50 and at least one rotor hub outlet 52. In some embodiments, the rotor hub channel 50 can be positioned within the rotor hub 32 and can be generally perpendicular to a horizontal axis of the output shaft 40. More specifically, in some embodiments, the rotor hub channel 50 can comprise a passageway which can extend from an outer diameter of the rotor hub 32, proximate to the plurality of rotor laminations 30, to the inner diameter of the rotor hub 32, proximate to the cavity 36, although the rotor hub channel 50 need not extend the entire radial length of the rotor hub 32. Furthermore, in some embodiments, the rotor hub channel 50 can be in fluid communication with the cavity 36 so that at least a portion of the coolant entering the cavity 36 can circulate through the rotor hub channel 50. In some embodiments, centrifugal force created by the movement of the operating rotor assembly 28 can cause at least some of the coolant to flow from the cavity 36 radially outward through the rotor hub channel 50.

In some embodiments, the rotor hub outlet 52 also can be positioned within the rotor hub 32 and can be oriented generally parallel to the horizontal axis of the output shaft 40. In some embodiments, the rotor hub outlet 52 can comprise a plurality of rotor hub outlets 52. Also, in some embodiments, the rotor hub outlet 52 need not be oriented generally parallel to the horizontal axis of the output shaft 40, and can be oriented in a direction desired by the manufacturer and/or end user. In some embodiments, the rotor hub outlet 52 can fluidly connect the rotor hub channel 50 with the machine cavity 22. For example, as previously mentioned, in some embodiments, coolant can circulate radially outward from the cavity 36 through the rotor hub channel 50 and at least a portion of the coolant can flow through the rotor hub outlet 52 and enter the machine cavity 22. In some embodiments, after flowing through the rotor hub outlet 52, at least a portion of the coolant can axially and radially flow through the machine cavity 22 and can come in contact with, and can receive heat energy from many of the previously mentioned electric machine module 10 components, which can lead to electric machine cooling.

In some embodiments, the output shaft 40 can include a sleeve 54 that can aid in cooling the components of the electric machine module 10. As shown in FIG. 3, in some embodiments, the sleeve 54 can be positioned substantially between the inner diameter of the rotor hub 32 and the outer diameter of the output shaft 40, can be generally positioned within the cavity 36, and can be generally axially outward from the output shaft coolant outlet 48. As shown in FIG. 4C, the sleeve 54 can substantially circumscribe a portion of the output shaft 40. In some embodiments, the sleeve 54 can be press-fit or interference-fit into position, but in other embodiments, the sleeve 54 can be positioned using other suitable installation methods so that the sleeve 54 is in close tolerance with the rotor hub 32 when the electric machine 14 is substantially assembled. Furthermore, in some embodiments, the sleeve 54 can comprise nylon-containing materials. In other embodiments, the sleeve 54 can comprise other materials such as a polymer or another suitable material.

In some embodiments, the sleeve 54 can be integral with the output shaft 40. More specifically, in some embodiments, the sleeve 54, including some of the sleeve 54 embodiments discussed below, can be machined directly into the output shaft 40 so that the sleeve 54 and the output shaft 40 are substantially one body.

Referring to FIGS. 3 and 4, in some embodiments, the sleeve 54 can include at least one groove 56 along an outer diameter of the sleeve 54, and the groove 56 can substantially circumscribe the sleeve 54. In some embodiments, the sleeve 54 can include a plurality of grooves 56, such as four grooves 56, however, any number of grooves 56 and any size and shape of grooves 56 can be included to meet manufacturing and/or end-user requirements. In some embodiments, the grooves 56 can comprise a generally square, rectangular, or other regular or irregular polygonal shape. In other embodiments, the grooves 56 can comprise a generally saw-tooth shape. Further, in some embodiments, the grooves 56 need not all comprise identical shapes and can comprise several different shapes. Additionally, one or more of the grooves 56 can be formed by enlarging a portion of a diameter of the sleeve 54.

Referring to FIGS. 3 and 4, in some embodiments, the sleeve 54, the grooves 56, and the axial seal 43 can at least partially aid in guiding coolant flowing through the module 10. In some embodiments, as the coolant enters the cavity 36, at least a portion of the coolant can flow axially outward toward the sleeve 54 and the axial seal 43. In some embodiments, the sleeve 54 and the axial seal 43 can be configured and arranged to prevent a material amount of coolant from axially flowing outward, and coolant can be guided toward the rotor hub channel 50.

Furthermore, in some embodiments, a material amount of coolant flowing over the outer diameter of the sleeve 54 can be generally prevented from further axial flow by the grooves 56. The grooves 56 can create a local pressure drop with respect to the coolant flowing over the sleeve 54 and the grooves 56 that can lead to a local seal of the cavity 36. More specifically, the presence of the grooves 56 along a portion of the outer diameter of the sleeve 54 can change the surface tension along the outer diameter of the sleeve 54, which can result in the formation of at least a partial seal of the cavity 36 and the coolant being guided toward the rotor hub channel 50.

In some embodiments of the invention, the sleeve 54 can include a gland 58 and a seal member 60. In some embodiments, the gland 58 can comprise a machined channel that can substantially circumscribe a portion of the sleeve 54. Furthermore, in some embodiments, a portion of the seal member 60 can be substantially positioned within the gland 58 so that when the electric machine 14 is substantially assembled, the seal member 60 can contact the inner diameter of the rotor hub 32. In some embodiments, the seal member 60 can comprise an O-ring, a split bearing, a split ring, a seal ring, a seal, an expanded seal or another similar sealing member. In some embodiments, the split bearing can be expandable, which can at least partially ease manufacturing because of the ability of the split bearing to compensate for large tolerances. Additionally, the gland 58 and the seal member 60 can be configured so that they are compliant and do not exhibit a substantial loading force between the output shaft 40 and the rotor hub 32. More specifically, in some embodiments, the gland 58 and the seal member 60 will not cause the output shaft 40, rotor hub 32, or the bearings 41 to bind.

According to some embodiments of the invention, the sleeve 54, the gland 58, the seal member 60, and the axial seal 43 can at least partially aid in guiding coolant flowing through the module 10. As previously mentioned, in some embodiments, as the coolant enters the cavity 36, at least a portion of the coolant can flow axially outward toward the sleeve 54 and the axial seal 43. In some embodiments, the presence of the sleeve 54 and the axial seal 43 can prevent a material amount of coolant from axially flowing outward and the coolant can be guided toward the rotor hub channel 50.

Furthermore, in some embodiments, a material amount of coolant flowing over the outer diameter of the sleeve 54 can be generally prevented from further axial flow by the gland 58 and the seal member 60. For example, when the seal member 60 is positioned in the gland 58, the sleeve 54 can substantially obstruct and substantially seal any gap between the outer diameter of the sleeve 54 and the inner diameter of the rotor hub 32, which can lead to a portion of the coolant entering the cavity 36 to be guided toward the rotor hub channel 50. Furthermore, in some embodiments, as shown in FIGS. 3 and 4, both the grooves 56 and the gland 58/seal member 60 can both be included on the sleeve 54 to substantially seal the cavity 36 and aid in guiding the coolant toward the rotor hub channel 50. In some embodiments, the sleeve 54 can include the grooves 56 and can substantially lack the gland 58 and the seal member 60, and in other embodiments, the sleeve 54 can include the gland 58 and the seal member 60 and can substantially lack the grooves 56.

In some embodiments of the invention, the axial seal 43 and the sleeve 54 including the grooves 56 and/or the gland 58 and seal member 60 can enhance electric machine cooling. By guiding the coolant toward the rotor hub channel 50, and substantially limiting the axial flow of the coolant within the cavity 36, coolant can be circulated through the rotor hub channel 50 and into the machine cavity 22 through the outlet 52, which can lead to enhanced cooling. Also, in some embodiments where the operating speed of the electric machine 18 can be low enough so that centrifugal effects to radially draw a majority of the coolant outward are not largely available, some of the previously mentioned embodiments can aid in minimizing the axial flow of the coolant in the cavity 36 and guiding the coolant toward the rotor hub channel 50.

Moreover, in some embodiments, the sleeve 54 can increase the rate of coolant flow through the module 10. Because the sleeve 54 can at least partially limit the volume of the cavity 36 into which coolant flows by substantially sealing a portion of the cavity 36, a portion of the coolant can be directed through the rotor hub channel 50 at an increased rate and can reach the rotor assembly 28 and other element of the module 10 at an increased rate. In some embodiments, this can enhance module 10 cooling.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:

1. An electric machine module comprising:
    an electric machine including a rotor assembly, the rotor assembly including a rotor hub, the rotor hub including at least one rotor hub channel and at least one rotor hub outlet;
    an output shaft,
        the rotor hub substantially circumscribing a portion of the output shaft, and
        the output shaft comprising at least one output shaft channel and at least one output shaft coolant outlet;
    an axial seal substantially contacting an outer diameter of the output shaft;
    a cavity formed by at least the output shaft, the rotor hub, the axial seal; and
    a sleeve substantially circumscribing a portion of the output shaft and at least a portion of the sleeve positioned substantially within the cavity and between the outer diameter of the output shaft and the inner diameter of the rotor hub,
        the sleeve comprising at least one groove, and
        the sleeve being configured and arranged to substantially seal a portion of the cavity.

2. The electric machine module of claim 1, wherein the axial seal comprises a positive stop positioned on the output shaft.

3. The electric machine module of claim 1, and further comprising a housing substantially enclosing at least a portion of the electric machine, the housing at least partially defining a machine cavity, the machine cavity in fluid communication with the at least one rotor hub outlet.

4. The electric machine module of claim 3, wherein the at least one output shaft channel is in fluid communication with the at least one output shaft coolant outlet;
    the cavity is in fluid communication with the at least one output shaft coolant outlet and the at least one rotor hub channel; and
    the at least one rotor hub outlet is in fluid communication with the machine cavity and the at least one rotor hub channel.

5. The electric machine module of claim 1, wherein the axial seal comprises a plurality of rotor hub splines dimensioned to engage a plurality of output shaft splines.

6. The electric machine module of claim 1, wherein the sleeve further comprises a gland and a seal member positioned at least partially within the gland.

7. The electric machine module of claim 6, wherein the seal member comprises an o-ring.

8. The electric machine module of claim 6, wherein the seal member comprises a split ring.

9. The electric machine module of claim 1, wherein the sleeve comprises a plurality of grooves.

10. An electric machine module comprising:
    an electric machine including a rotor assembly, the rotor assembly including a rotor hub, the rotor hub including at least one rotor hub channel and at least one rotor hub outlet;
    an output shaft,
        the rotor hub substantially circumscribing a portion of the output shaft, and
        the output shaft comprising at least one output shaft channel and at least one output shaft coolant outlet;
    an axial seal substantially contacting an outer diameter of the output shaft;
    a cavity formed by at least the output shaft, the rotor hub, the axial seal; and
    a sleeve substantially circumscribing a portion of the output shaft and at least a portion of the sleeve positioned substantially within the cavity and between the outer diameter of the output shaft and the inner diameter of the rotor hub,
        the sleeve comprising a gland and a seal member at least partially positioned within the gland, and
        the sleeve being configured and arranged to substantially seal a portion of the cavity.

11. The electric machine module of claim 10, wherein the seal member comprises an o-ring.

12. The electric machine module of claim 10, wherein the seal member comprises a split ring.

13. The electric machine module of claim 10, wherein the sleeve further comprises at least one groove.

14. The electric machine module of claim 13, wherein the electric machine comprises an interior permanent magnet electric machine.

15. The electric machine module of claim 13, wherein the sleeve further comprises a plurality of grooves.

16. The electric machine module of claim 13, and further comprising a housing substantially enclosing at least a portion of the electric machine, the housing at least partially defining a machine cavity, the machine cavity in fluid communication with the at least one rotor hub outlet.

17. The electric machine module of claim 16, wherein the at least one output shaft channel is in fluid communication with the at least one output shaft coolant outlet;
    the cavity is in fluid communication with the at least one output shaft coolant outlet and the at least one rotor hub channel; and
    the at least one rotor hub outlet is in fluid communication with the machine cavity and the at least one rotor hub channel.

18. The electric machine module of claim 10, wherein the axial seal comprises a plurality of rotor hub splines dimensioned to engage a plurality of output shaft splines.

19. The electric machine module of claim 10, wherein the axial seal comprises a positive stop positioned on the output shaft.

20. An electric machine module comprising:
    an electric machine including a rotor assembly, the rotor assembly including a rotor hub, the rotor hub including at least one rotor hub channel and at least one rotor hub outlet;
    an output shaft,
        the rotor hub substantially circumscribing a portion of the output shaft,
        the output shaft comprising at least one output shaft channel and at least one output shaft coolant outlet, and
        the output shaft comprising an integral sleeve;
    an axial seal substantially contacting an outer diameter of the output shaft; and a cavity formed by at least the output shaft, the rotor hub, the axial seal,
   at least a portion of the integral sleeve extending into the cavity, and
   the integral sleeve being configured and arranged to substantially seal a portion of the cavity.

\* \* \* \* \*